United States Patent
Wu et al.

(10) Patent No.: US 9,712,237 B2
(45) Date of Patent: Jul. 18, 2017

(54) OPTICAL DISTRIBUTION METHOD, DEVICE, AND SYSTEM

(71) Applicant: Huawei Technologies Co., Ltd., Shenzhen (CN)

(72) Inventors: Shiquan Wu, Shenzhen (CN); Zhiwei Zhong, Shenzhen (CN); Guoping Liu, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 294 days.

(21) Appl. No.: 14/562,425

(22) Filed: Dec. 5, 2014

(65) Prior Publication Data
US 2015/0093112 A1 Apr. 2, 2015

Related U.S. Application Data

(63) Continuation of application No. PCT/CN2013/072210, filed on Mar. 6, 2013.

(30) Foreign Application Priority Data

Jun. 6, 2012 (CN) .......................... 2012 1 0183957

(51) Int. Cl.
*H04J 14/00* (2006.01)
*H04B 10/25* (2013.01)
(Continued)

(52) U.S. Cl.
CPC ......... *H04B 10/2504* (2013.01); *H04L 43/10* (2013.01); *H04Q 1/136* (2013.01)

(58) Field of Classification Search
CPC ... H04B 10/2504; H04B 10/272; H04L 43/10; H04Q 11/0067; H04Q 1/136; H04Q 2011/0083
See application file for complete search history.

(56) References Cited

U.S. PATENT DOCUMENTS

| 5,394,503 A | 2/1995 | Dietz, Jr. et al. |
| 2004/0137897 A1 | 7/2004 | Teixeira |

(Continued)

FOREIGN PATENT DOCUMENTS

| CN | 101841426 A | 9/2010 |
| CN | 101848106 A | 9/2010 |

(Continued)

*Primary Examiner* — Omeed Alizada
(74) *Attorney, Agent, or Firm* — Oblon, McClelland, Maier & Neustadt, L.L.P.

(57) ABSTRACT

The present invention provide an optical distribution method that includes determining, a first optical distribution frame and a second optical distribution frame, and generating first port indication information and second port indication information according to fiber patch cord setting information; and sending the first port indication information to the first optical distribution frame, sending the second port indication information to the second optical distribution frame, receiving a first port identity and a fiber patch cord identity corresponding to the first port identity which are sent by the first optical distribution frame, and receiving a second port identity and a fiber patch cord identity corresponding to the second port identity which are sent by the second optical distribution frame.

14 Claims, 3 Drawing Sheets (51) Int. Cl.
*H04Q 1/02* (2006.01)
*H04L 12/26* (2006.01)

(56) References Cited

U.S. PATENT DOCUMENTS

| | | |
|---|---|---|
| 2009/0166404 A1 | 7/2009 | German et al. |
| 2011/0081144 A1* | 4/2011 | Zhao .................. H04B 10/272 398/20 |
| 2013/0205579 A1* | 8/2013 | Mather ................ H04Q 1/138 29/593 |

FOREIGN PATENT DOCUMENTS

| | | |
|---|---|---|
| CN | 202364243 U | 8/2012 |
| CN | 102752672 A | 10/2012 |

\* cited by examiner

OPTICAL DISTRIBUTION METHOD, DEVICE, AND SYSTEM

CROSS-REFERENCE TO RELATED APPLICATION

This application is a continuation of International Application No. PCT/CN2013/072210, filed on Mar. 6, 2013, which claims priority to Chinese Patent Application No. 201210183957.5, filed on Jun. 6, 2012, both of which are hereby incorporated by reference in their entireties.

TECHNICAL FIELD

Embodiments of the present invention relate to communications technologies, and in particular, to an optical distribution method, device, and system.

BACKGROUND

With gradual popularization of FTTx (x=H for home, P for premises, C for curb, and N for node or neighborhood, where FTTH stands for fiber to the home, FTTP stands for fiber to the premises, FTTC stands for fiber to the curb/community, and FTTN stands for fiber to the node), an optical distribution network technology is developed rapidly.

An optical distribution frame (Optical Distribution Frame, ODF for short) is one of basic devices that form an optical distribution network. A plurality of ports for inserting fibers are set on the optical distribution frame, and two ports may be connected by a fiber patch cord, thereby implementing connection between fibers. The optical distribution frame may read an electronic ID (Electronic Identity) of an inserted fiber patch cord to determine a connection relationship between a fiber patch cord and a port. In a construction process, a mobile terminal equipped with iField (Intelligent Field) software may be connected to an optical distribution frame to collect a connection relationship between a fiber patch cord and a port of the optical distribution frame. However, when fiber patch cord construction is performed between different optical distribution frames, the optical distribution frames may be set in different areas, and the fiber patch cord construction process needs to be completed by using a same mobile terminal. After a construction person collects information about an optical distribution frame by using a mobile terminal, it must be ensured that the information is not overwritten and that construction needs to be performed on another optical distribution frame immediately. When the information stored in the mobile terminal is inconsistent with the reality, the construction cannot be completed.

SUMMARY

Embodiments of the present invention provide an optical distribution method, device, and system to avoid the problem that construction information in a mobile terminal equipped with iField is liable to be overwritten, and increase efficiency of cross-cabinet fiber patch cord construction.

An embodiment of the present invention provides an optical distribution method, including: determining at least a first optical distribution frame and a second optical distribution frame, and generating first port indication information and second port indication information according to fiber patch cord setting information; and sending the first port indication information to the first optical distribution frame, sending the second port indication information to the second optical distribution frame, receiving a first port identity and a fiber patch cord identity corresponding to the first port identity which are sent by the first optical distribution frame, and receiving a second port identity and a fiber patch cord identity corresponding to the second port identity which are sent by the second optical distribution frame.

An embodiment of the present invention provides an optical distribution method, including: receiving port indication information sent by a cluster management device, and turning on an indicator of a port corresponding to the port indication information; and, when it is detected that a fiber patch cord is inserted into the port, obtaining a fiber patch cord identity of the fiber patch cord and a port identity of the port, and sending the fiber patch cord identity and the port identity to the cluster management device.

An embodiment of the present invention provides a cluster management device, including: a first processing unit, configured to determine, at least a first optical distribution frame and a second optical distribution frame, and generating first port indication information and second port indication information according to fiber patch cord setting information; and a second processing unit, configured to send the first port indication information to the first optical distribution frame, send the second port indication information to the second optical distribution frame, receive a first port identity and a fiber patch cord identity corresponding to the first port identity which are sent by the first optical distribution frame, and receive a second port identity and a fiber patch cord identity corresponding to the second port identity which are sent by the second optical distribution frame.

An embodiment of the present invention provides an optical distribution frame, including: a third processing unit, configured to receive port indication information sent by a cluster management device, and turn on an indicator of a port corresponding to the port indication information; and a fourth processing unit, configured to obtain, when it is detected that a fiber patch cord is inserted into the port, a fiber patch cord identity of the fiber patch cord and a port identity of the port, and send the fiber patch cord identity and the port identity to the cluster management device.

An embodiment of the present invention provides an optical distribution system, including: a cluster management device provided in an embodiment of the present invention, and at least two optical distribution frames provided in an embodiment of the present invention.

According to the foregoing technical solutions, in the optical distribution method, device, and system provided in the embodiments of the present invention, a cluster management device determines, at least a first optical distribution frame and a second optical distribution frame, and generates first port indication information and second port indication information according to fiber patch cord setting information, sends the first port indication information to the first optical distribution frame, sends the second port indication information to the second optical distribution frame, receives a first port identity and a fiber patch cord identity corresponding to the first port identity which are sent by the first optical distribution frame, and receives a second port identity and a fiber patch cord identity corresponding to the second port identity which are sent by the second optical distribution frame. Construction task delivery and construction information reporting are implemented when fiber patch cord construction is performed between different optical distribution frames, thereby avoiding the problem that construction information in a mobile terminal equipped with iField is liable to be overwritten, and increasing efficiency of cross-cabinet fiber patch cord construction.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
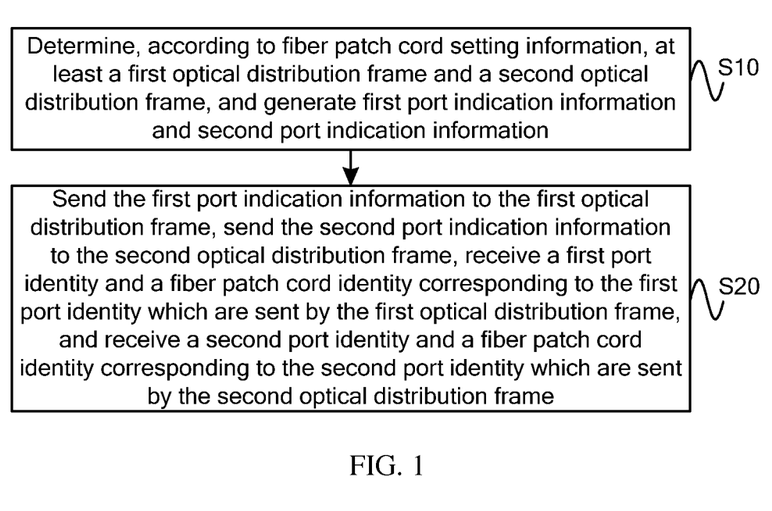
FIG. 1 is a flowchart of an optical distribution method according to an embodiment of the present invention.

FIG. 1 is a flowchart of an optical distribution method according to an embodiment of the present invention. As shown in FIG. 1, the optical distribution method provided in this embodiment may specifically be applied to a fiber patch cord construction process performed between at least two optical distribution frames, and the optical distribution method provided in this embodiment may be performed by a cluster management device, where the cluster management device may manage all optical distribution frames within a management scope of the cluster management device. The cluster management device may be implemented by using software and/or hardware.

The optical distribution method provided in this embodiment specifically includes the following steps.

Step S10: Determine, at least a first optical distribution frame and a second optical distribution frame, and generate first port indication information and second port indication information according to fiber patch cord setting information.

Step S20: Send the first port indication information to the first optical distribution frame, send the second port indication information to the second optical distribution frame, receive a first port identity and a fiber patch cord identity corresponding to the first port identity which are sent by the first optical distribution frame, and receive a second port identity and a fiber patch cord identity corresponding to the second port identity which are sent by the second optical distribution frame.

Specifically, the fiber patch cord setting information may specifically be a construction work order, which may include information about at least two optical distribution frames, and may further include information about a port to be constructed on each optical distribution frame. The cluster management device may store information about an optical distribution frame managed by the cluster management device, and the cluster management device may determine a to-be-constructed port according to usage of a to-be-constructed optical distribution frame in the fiber patch cord setting information. The fiber patch cord setting information may specifically be delivered by a network management device. The cluster management device may determine, according to the fiber patch cord setting information, at least the first optical distribution frame and the second optical distribution frame, and generate the first port indication information corresponding to the first optical distribution frame, and the second port indication information corresponding to the second optical distribution frame. The first port indication information is used to indicate a first port on the first optical distribution frame, where the first port is used for inserting one end of a fiber patch cord. The second port indication information is used to indicate a second port on the second optical distribution frame, where the second port is used for inserting the other end of a fiber patch cord.

The cluster management device may specifically implement communication with the first optical distribution frame or the second optical distribution frame through an Ethernet port or an RS232/RS485 serial port. The cluster management device sends the first port indication information to the first optical distribution frame, and sends the second port indication information to the second optical distribution frame. After receiving the first port indication information, the first optical distribution frame turns on an indicator of the first port corresponding to the first port indication information, where the indicator may specifically be an LED (light emitting diode) indicator. A construction person may insert one end of the fiber patch cord into the first port according to the indicator, and when the first optical distribution frame detects insertion of the fiber patch cord, the first optical distribution frame obtains the fiber patch cord identity of the fiber patch cord and the first port identity of the first port, where the fiber patch cord identity is specifically an electronic ID of the fiber patch cord. The fiber patch cord identity and the first port identity are sent to the cluster management device, and the cluster management device may know that one end of the fiber patch cord indicated by the fiber patch cord identity is connected to the first port of the first optical distribution frame. Similarly, after receiving the second port indication information, the second optical distribution frame turns on an indicator of the second port corresponding to the second port indication information, and the construction person may insert the other end of the fiber patch cord into the second port according to the indicator.

When the second optical distribution frame detects insertion of the fiber patch cord, the second optical distribution frame obtains the fiber patch cord identity of the fiber patch cord and the second port identity of the second port, and sends the fiber patch cord identity and the second port identity to the cluster management device. The cluster management device may know that the other end of the fiber patch cord indicated by the fiber patch cord identity is connected to the second port of the second optical distribution frame, and may determine that the fiber patch cord connects the first port of the first optical distribution frame and the second port of the second optical distribution frame.

It should be noted that, no necessary time sequence relationship exists between sending, by the cluster management device, the second port indication information to the second optical distribution frame, and receiving the first port identity and the fiber patch cord identity corresponding to the first port identity which are sent by the first optical distribution frame.

In the optical distribution method provided in this embodiment, a cluster management device determines, at least a first optical distribution frame and a second optical distribution frame, and generates first port indication information and second port indication information according to fiber patch cord setting information, sends the first port indication information to the first optical distribution frame, sends the second port indication information to the second optical distribution frame, receives a first port identity and a fiber patch cord identity corresponding to the first port identity which are sent by the first optical distribution frame, and receives a second port identity and a fiber patch cord identity corresponding to the second port identity which are sent by the second optical distribution frame. Construction task delivery and construction information reporting are implemented when fiber patch cord construction is performed between different optical distribution frames, thereby avoiding the problem that construction information in a mobile terminal equipped with iField is liable to be overwritten, and increasing efficiency of cross-cabinet fiber patch cord construction.

Further, in this embodiment, before the receiving a second port identity and a fiber patch cord identity corresponding to the second port identity which are sent by the second optical distribution frame in step S20, the following step may further be included:

Step S30: Receive a to-be-determined fiber patch cord identity sent by the second optical distribution frame, and if the to-be-determined fiber patch cord identity is the same as the fiber patch cord identity corresponding to the first port identity, send an indication report of a correct fiber patch cord to the second optical distribution frame, and if the to-be-determined fiber patch cord identity is not the same as the fiber patch cord identity corresponding to the first port identity, send an indication report of a error fiber patch cord to the second optical distribution frame.

When a plurality of idle fiber patch cords have been laid on a construction site, the construction person does not know which fiber patch cord is to be processed. The construction person may randomly choose a fiber patch cord, insert one end of the fiber patch cord into the first port of the first optical distribution frame, and when the first optical distribution frame detects insertion of the fiber patch cord, the first optical distribution frame obtains a fiber patch cord identity of the fiber patch cord and the first port identity of the first port, and sends the fiber patch cord identity and the first port identity to the cluster management device. When the construction person processes the other end of a fiber patch cord, the construction person may also randomly choose a fiber patch cord, and perform detection of the fiber patch cord. Then a detection unit may be set, where the detection unit may be set on the second optical distribution frame, or may be set independently. A detection port is set on the detection unit. The construction person may insert the fiber patch cord into the detection port, and the detection port obtains a fiber patch cord identity of the fiber patch cord, and sends the fiber patch cord identity to the cluster management device as a to-be-determined fiber patch cord identity.

The cluster management device compares the to-be-determined fiber patch cord identity with the fiber patch cord identity sent by the first optical distribution frame. If the two are the same, the cluster management device sends an indication report of a correct fiber patch cord to the second optical distribution frame, and the second optical distribution frame may display the indication report to indicate to the construction person that the detected fiber patch cord is the to-be-constructed fiber patch cord. If the two are different, the cluster management device sends an indication report of a error fiber patch cord to the second optical distribution frame, and the construction person may choose, according to the indication report, another fiber patch cord for detection until the to-be-constructed fiber patch cord is detected. By detecting the fiber patch cord, correctness of the fiber patch cord construction can be ensured.

Further, in this embodiment, the optical distribution method may further include following step.

Step S40: Send the first port identity and the fiber patch cord identity corresponding to the first port identity and the second port identity and the fiber patch cord identity corresponding to the second port identity to a network management device.

Specifically, if the fiber patch cord identity corresponding to the first port identity is the same as the fiber patch cord identity corresponding to the second port identity, the cluster management device sends the first port identity, the second port identity, and the fiber patch cord identities to the network management device as a group of information, and the network management device stores the received information to implement management of an optical distribution network.

Further, in this embodiment, after the sending the first port indication information to the first optical distribution frame, and before the receiving a first port identity and a fiber patch cord identity corresponding to the first port identity which are sent by the first optical distribution frame in step S20, the following step may further be included:

Step S50: Receive a first error report sent by the first optical distribution frame, regenerate first port indication information according to the first error report, and send the regenerated first port indication information to the first optical distribution frame.

When the first port indicated by the first port indication information is unavailable, the first optical distribution frame sends the first error report to the cluster management device. The following situations in which the first port is unavailable may exist: the first port is not a port of the first optical distribution frame; another fiber patch cord has been inserted into the first port; the first port is damaged, and so on. The cluster management device regenerates the first port indication information according to the first error report so as to indicate another port to the first optical distribution frame.

Further, in this embodiment, after the sending the second port indication information to the second optical distribution frame, and before the receiving a second port identity and a fiber patch cord identity corresponding to the second port identity which are sent by the second optical distribution frame in step S20, the following may be included:

Step S60: Receive a second error report sent by the second optical distribution frame, regenerate second port indication information according to the second error report, and send the regenerated second port indication information to the second optical distribution frame.

When the second port indicated by the second port indication information is unavailable, the second optical distribution frame sends the second error report to the cluster management device. The following situations in which the second port is unavailable may exist: the second port is not a port of the second optical distribution frame; another fiber patch cord has been inserted into the second port; the second port is damaged, and so on. The cluster management device regenerates the second port indication information according to the second error report so as to indicate another port to the second optical distribution frame.

Figure 2:
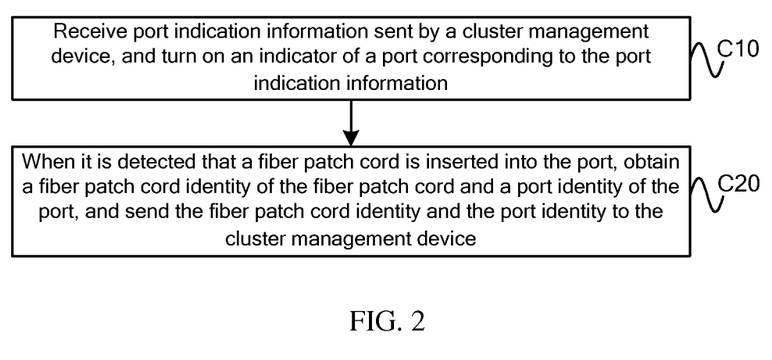
FIG. 2 is a flowchart of another optical distribution method according to an embodiment of the present invention.

FIG. 2 is a flowchart of another optical distribution method according to an embodiment of the present invention. As shown in FIG. 2, the optical distribution method provided in this embodiment may work with an optical distribution method applied on a cluster management device side according to any embodiment of the present invention to implement a fiber patch cord construction process between at least two optical distribution frames, and the specific implementation process is not described herein again. The optical distribution method provided in this embodiment may be performed by an optical distribution frame, and particularly, an intelligent optical distribution frame.

The optical distribution method provided in this embodiment specifically includes:

Step C10: Receive port indication information sent by a cluster management device, and turn on an indicator of a port corresponding to the port indication information.

Step C20: When it is detected that a fiber patch cord is inserted into the port, obtain a fiber patch cord identity of the fiber patch cord and a port identity of the port, and send the fiber patch cord identity and the port identity to the cluster management device.

In the optical distribution method provided in this embodiment, an optical distribution frame receives port indication information sent by a cluster management device, and turns on an indicator of a port corresponding to the port indication information. When the optical distribution frame detects that a fiber patch cord is inserted into the port, the optical distribution frame obtains a fiber patch cord identity of the fiber patch cord and a port identity of the port, and sends the fiber patch cord identity and the port identity to the cluster management device. Construction task delivery and construction information reporting are implemented when fiber patch cord construction is performed between different optical distribution frames, thereby avoiding the problem that construction information in a mobile terminal equipped with iField is liable to be overwritten, and increasing efficiency of cross-cabinet fiber patch cord construction.

Further, in this embodiment, before the receiving port indication information sent by a cluster management device in step C10, the following step may further be included:

Step C30: When it is detected that the fiber patch cord is inserted into a detection port, obtain a fiber patch cord identity of the fiber patch cord, and send the fiber patch cord identity to the cluster management device as a to-be-determined fiber patch cord identity.

A port in the optical distribution frame may be set as a detection port in advance, or a detection unit with a detection port may also be set independently, so as to implement detection of a fiber patch cord.

In this embodiment, the receiving port indication information sent by a cluster management device, and turning on an indicator of a port corresponding to the port indication information in step C10 may specifically include following step:

Receive the port indication information sent by the cluster management device, determine whether the port corresponding to the port indication information is available, and if the port is available, turn on the indicator of the port, and if the port is unavailable, send an error report to the cluster management device.

The optical distribution frame may firstly check whether the received port indication information is correct. When the port corresponding to the port indication information is unavailable, the optical distribution frame sends an error report to the cluster management device to increase correctness of the fiber patch cord construction.

In an actual application process, whenever a fiber patch cord is inserted into a port, an optical distribution frame detects the fiber patch cord, and when an obtained correspondence between a fiber patch cord identity and a port identity is changed, a new correspondence between the fiber patch cord identity and the port identity may be sent to a cluster management device, so that the cluster management device may instantly update the information about the optical distribution frame.

Figure 3:
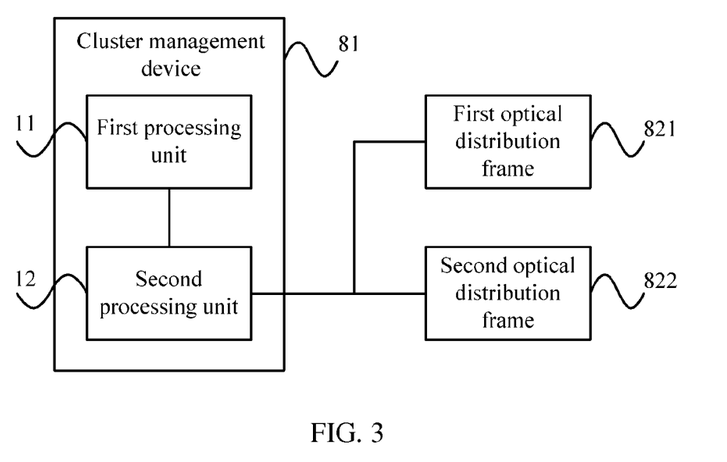
FIG. 3 is a schematic structural diagram of a cluster management device according to an embodiment of the present invention.

FIG. 3 is a schematic structural diagram of a cluster management device according to an embodiment of the present invention. As shown in FIG. 3, a cluster management device 81 provided in this embodiment may specifically implement each step of an optical distribution method that is provided in any embodiment of the present invention and applied to the cluster management device 81, which is not described herein again. The cluster management device 81 provided in this embodiment specifically includes a first processing unit 11 and a second processing unit 12. The first processing unit 11 is configured to determine, at least a first optical distribution frame 821 and a second optical distribution frame 822, and generate first port indication information and second port indication information according to fiber patch cord setting information. The second processing unit 12 is configured to send the first port indication information to the first optical distribution frame 821, send the second port indication information to the second optical distribution frame 822, receive a first port identity and a fiber patch cord identity corresponding to the first port identity which are sent by the first optical distribution frame 821, and receive a second port identity and a fiber patch cord identity corresponding to the second port identity which are sent by the second optical distribution frame 822.

In a cluster management device 81 provided in this embodiment, a first processing unit 11 determines, a first optical distribution frame 821 and a second optical distribution frame 822, and generates first port indication information and second port indication information according to fiber patch cord setting information; and a second processing unit 12 sends the first port indication information to the first optical distribution frame 821, sends the second port indication information to the second optical distribution frame 822, receives a first port identity and a fiber patch cord identity corresponding to the first port identity which are sent by the first optical distribution frame 821, and receives a second port identity and a fiber patch cord identity corresponding to the second port identity which are sent by the second optical distribution frame 822. Construction task delivery and construction information reporting are implemented when fiber patch cord construction is performed between different optical distribution frames, thereby avoiding the problem that construction information in a mobile terminal equipped with iField is liable to be overwritten, and increasing efficiency of cross-cabinet fiber patch cord construction.

Figure 4:
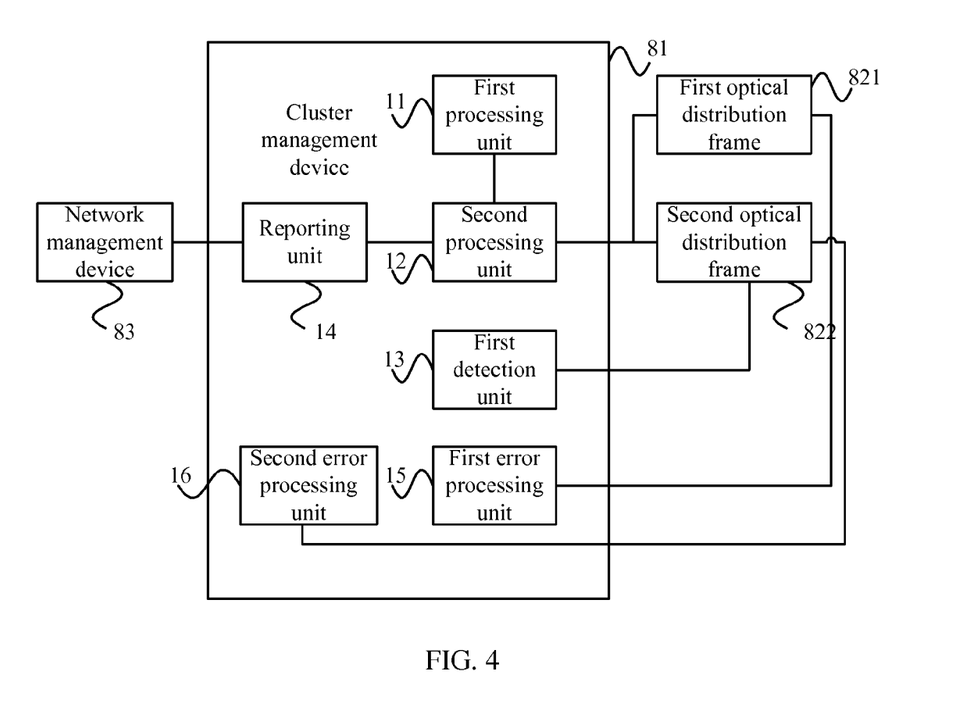
FIG. 4 is a schematic structural diagram of another cluster management device according to an embodiment of the present invention.

FIG. 4 is a schematic structural diagram of another cluster management device according to an embodiment of the present invention. As shown in FIG. 4, further in this embodiment, the cluster management device 81 may further include a first detection unit 13, where the first detection unit 13 is configured to receive a to-be-determined fiber patch cord identity sent by the second optical distribution frame 822. If the to-be-determined fiber patch cord identity is the same as the fiber patch cord identity corresponding to the first port identity, an indication report of a correct fiber patch cord is sent to the second optical distribution frame 822, and if the to-be-determined fiber patch cord identity is not the same as the fiber patch cord identity corresponding to the first port identity, an indication report of a error fiber patch cord is sent to the second optical distribution frame 822. By setting the first detection unit 13 and performing detection of the fiber patch cord, correctness of the fiber patch cord construction can be ensured.

Further in this embodiment, the cluster management device 81 may further include a reporting unit 14, where the reporting unit 14 is configured to send the first port identity and the fiber patch cord identity corresponding to the first port identity and the second port identity and the fiber patch cord identity corresponding to the second port identity to a network management device 83.

Further in this embodiment, the cluster management device 81 may further include a first error processing unit 15, where the first error processing unit 15 is configured to receive a first error report sent by the first optical distribution frame 821, regenerate first port indication information according to the first error report, and send the regenerated first port indication information to the first optical distribution frame 821.

Further in this embodiment, the cluster management device 81 may further include a second error processing unit 16, where the second error processing unit 16 is configured to receive a second error report sent by the second optical distribution frame 822, regenerate second port indication information according to the second error report, and send the regenerated second port indication information to the second optical distribution frame 822.

Figure 5:
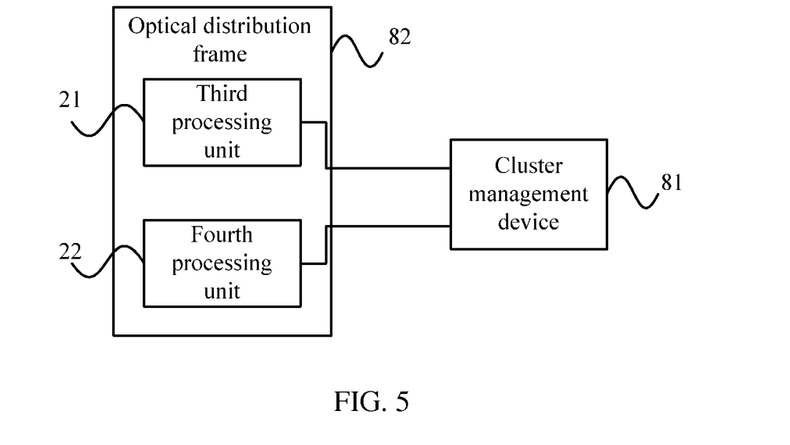
FIG. 5 is a schematic structural diagram of an optical distribution frame according to an embodiment of the present invention.

FIG. 5 is a schematic structural diagram of an optical distribution frame according to an embodiment of the present invention. As shown in FIG. 5, an optical distribution frame 82 provided in this embodiment may specifically implement each step of an optical distribution method that is provided in any embodiment of the present invention and applied to the optical distribution frame 82, which is not described herein again. The optical distribution frame 82 provided in this embodiment specifically includes a third processing unit 21 and a fourth processing unit 22. The third processing unit 21 is configured to receive port indication information sent by the cluster management device 81, and turn on an indicator of a port corresponding to the port indication information. The fourth processing unit 22 is configured to obtain, when it is detected that a fiber patch cord is inserted into the port, a fiber patch cord identity of the fiber patch cord and a port identity of the port, and send the fiber patch cord identity and the port identity to the cluster management device 81.

In an optical distribution frame 82 provided in this embodiment, a third processing unit 21 receives port indication information sent by a cluster management device 81, and turns on an indicator of a port corresponding to the port indication information. When detecting that a fiber patch cord is inserted into the port, a fourth processing unit 22 obtains a fiber patch cord identity of the fiber patch cord and a port identity of the port, and sends the fiber patch cord identity and the port identity to the cluster management device 81. Construction task delivery and construction information reporting are implemented when fiber patch cord construction is performed between different optical distribution frames 82, thereby avoiding the problem that construction information in a mobile terminal equipped with iField is liable to be overwritten, and increasing efficiency of cross-cabinet fiber patch cord construction.

Figure 6:
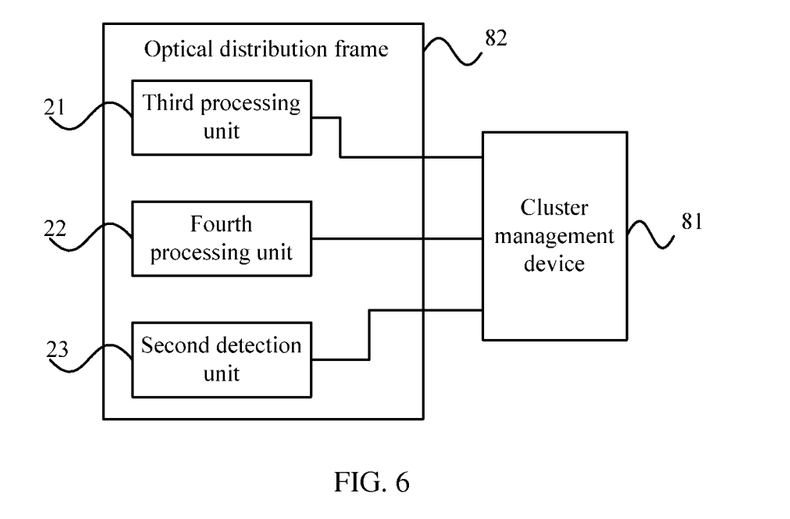
FIG. 6 is a schematic structural diagram of another optical distribution frame according to an embodiment of the present invention.

FIG. 6 is a schematic structural diagram of another optical distribution frame according to an embodiment of the present invention. As shown in FIG. 6, further in this embodiment, the optical distribution frame 82 may also include a second detection unit 23, where the second detection unit 23 is configured to obtain, when it is detected that the fiber patch cord is inserted into a detection port, a fiber patch cord identity of the fiber patch cord, send the fiber patch cord identity to the cluster management device 81 as a to-be-determined fiber patch cord identity, and receive an indication report of a correct fiber patch cord or an indication report of a error fiber patch cord sent by the cluster management device 81.

In this embodiment, the third processing unit 21 may further be configured to receive port indication information sent by the cluster management device 81, determine whether a port corresponding to the port indication information is available, and if the port is available, turn on an indicator of the port, and if the port is unavailable, send an error report to the cluster management device 81. By means of error reporting, correctness of the fiber patch cord construction can be ensured.

The first optical distribution frame and the second optical distribution frame in the foregoing embodiments may be implemented by the optical distribution frame 82 provided in this embodiment.

An optical distribution system provided in an embodiment of the present invention includes: a cluster management device provided in any embodiment of the present invention, and an optical distribution frame provided in any embodiment of the present invention.

In the optical distribution method, device, and system provided in the embodiments of the present invention, management and data interaction are implemented for a plurality of optical distribution frames by using a cluster management device, thereby effectively solving a coordination problem in construction guidance services that is related to fiber patch cord construction between different optical distribution frames.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An optical distribution method, comprising:
determining, via a first processor, a first optical distribution frame;
generating, via the first processor, first port indication information based on fiber patch cord setting information;
sending, via a second processor, the first port indication information to the first optical distribution frame;
receiving, via a first error processor, a first error report from the first optical distribution frame;
generating, via the first error processor, first modified port indication information based on the first error report;
sending, via the first error processor, the first modified port indication information to the first optical distribution frame; and
receiving, via the second processor, a first port identity and a first fiber patch cord identity corresponding to the first port identity from the first optical distribution frame.

2. The method according to claim 1, further comprising:
determining, via the first processor, a second optical distribution frame;
generating, via the first processor, second port indication information based on the fiber patch cord setting information;
sending, via the first processor, the second port indication information to the second optical distribution frame; and
receiving, via the second processor, a second port identity and a second fiber patch cord identity corresponding to the second port identity from the second optical distribution frame.

3. The method according to claim 2, wherein, before receiving the second port identity and the second fiber patch cord identity corresponding to the second port identity, the method further comprises:
receiving a to-be-determined fiber patch cord identity from the second optical distribution frame;
when the to-be-determined fiber patch cord identity is the same as the first fiber patch cord identity corresponding to the first port identity, sending an indication report of a correct fiber patch cord to the second optical distribution frame; and
when the to-be-determined fiber patch cord identity is not the same as the first fiber patch cord identity corresponding to the first port identity, sending an indication report of an error fiber patch cord to the second optical distribution frame.

4. The method according to claim 2, further comprising sending the first port identity and the first fiber patch cord identity corresponding to the first port identity and the second port identity and the second fiber patch cord identity corresponding to the second port identity to a network management device.

5. The method according to claim 2, wherein, after sending the second port indication information to the second optical distribution frame and before receiving the second port identity and the second fiber patch cord identity corresponding to the second port identity, the method further comprises:
receiving a second error report from the second optical distribution frame;
generating second modified port indication information based on the second error report; and
sending the second modified port indication information to the second optical distribution frame.

6. An optical distribution method, comprising:
receiving, via a first processor, port indication information from a cluster management device;
determining, via the first processor, whether the port corresponding to the port indication information is available;
when the port is available, turning on, via the first processor, an indicator of a port corresponding to the port indication information;
when the port is unavailable:
sending, via the first processor, an error report to the cluster management device; and
receiving, via the first processor, modified port indication information that is based on the error report;
obtaining, via a second processor, a fiber patch cord identity of the fiber patch cord and a port identity of the port when it is detected that a fiber patch cord is inserted into the port; and
sending, via the second processor, the fiber patch cord identity and the port identity to the cluster management device.

7. The method according to claim 6, wherein, before receiving the port indication information from the cluster management device, the method further comprises:
detecting that the fiber patch cord is inserted into a detection port;
obtaining a fiber patch cord identity of the fiber patch cord; and
sending the fiber patch cord identity to the cluster management device as a to-be-determined fiber patch cord identity.

8. A cluster management device, comprising:
a processor; and
a non-transitory computer-readable storage medium storing instructions to be executed by the processor, such that the processor is programmed to:
determine a first optical distribution frame;
generate first port indication information based on fiber patch cord setting information;
send the first port indication information to the first optical distribution frame;
receive a first error report from the first optical distribution frame;
generate first modified port indication information based on the first error report;
send the first modified port indication information to the first optical distribution frame; and
receive a first port identity and a first fiber patch cord identity corresponding to the first port identity from the first optical distribution frame.

9. The cluster management device according to claim 8, wherein the processor is further programmed to:
determine a second optical distribution frame;
generate second port indication information based on the fiber patch cord setting information;
send the second port indication information to the second optical distribution frame; and
receive a second port identity and a second fiber patch cord identity corresponding to the second port identity from the second optical distribution frame.

10. The cluster management device according to claim 9, wherein the processor is further programmed to:

receive a to-be-determined fiber patch cord identity from the second optical distribution frame;

when the to-be-determined fiber patch cord identity is the same as the first fiber patch cord identity corresponding to the first port identity, send an indication report of a correct fiber patch cord to the second optical distribution frame; and when the to-be-determined fiber patch cord identity is not the same as the first fiber patch cord identity corresponding to the first port identity, send an indication report of an error fiber patch cord to the second optical distribution frame.

11. The cluster management device according to claim 9, wherein the processor is further programmed to send the first port identity and the first fiber patch cord identity corresponding to the first port identity and the second port identity and the second fiber patch cord identity corresponding to the second port identity to a network management device.

12. The cluster management device according to claim 9, wherein the processor is further programmed to:
  receive a second error report from the second optical distribution frame;
  generate second modified port indication information based on the second error report; and
  send the second modified port indication information to the second optical distribution frame.

13. An optical distribution frame, comprising:
  a processor; and
  a non-transitory computer-readable storage medium storing instructions to be executed by the processor, such that the processor is programmed to:
    receive port indication information sent by a cluster management device;
    determine whether the port corresponding to the port indication information is available;
    when the port is available, turn on an indicator of a port corresponding to the port indication information;
    when the port is unavailable:
      send an error report to the cluster management device; and
      receive modified port indication information that is based on the error report;
    obtain a fiber patch cord identity of the fiber patch cord and a port identity of the port when it is detected that a fiber patch cord is inserted into the port; and
    send the fiber patch cord identity and the port identity to the cluster management device.

14. The optical distribution frame according to claim 13, wherein the processor is further programmed to:
  detect that the fiber batch cord is inserted into a detection port;
  obtain a fiber patch cord identity of the fiber patch cord;
  send the fiber patch cord identity to the cluster management device as a to-be-determined fiber patch cord identity; and
  receive an indication report of a correct fiber patch cord or an indication report of an error fiber patch cord from the cluster management device.

* * * * *

UNITED STATES PATENT AND TRADEMARK OFFICE
CERTIFICATE OF CORRECTION

PATENT NO. : 9,712,237 B2
APPLICATION NO. : 14/562425
DATED : July 18, 2017
INVENTOR(S) : Shiquan Wu et al.

Page 1 of 1

It is certified that error appears in the above-identified patent and that said Letters Patent is hereby corrected as shown below:

In the Claims

Column 14, Line 20, change "the fiber batch cord" to --the fiber patch cord--.

Signed and Sealed this
Eleventh Day of June, 2019

Andrei Iancu
*Director of the United States Patent and Trademark Office*